US006566440B2

(12) United States Patent
Kuroki et al.

(10) Patent No.: US 6,566,440 B2
(45) Date of Patent: May 20, 2003

(54) POLYTETRAFLUOROETHYLENE AGGLOMERATED PRODUCT AND ITS MOLDED PRODUCT

(75) Inventors: Satoru Kuroki, Chiba (JP); Takamichi Ishikawa, Chiba (JP); Masumi Nomura, Chiba (JP); Tadao Chiba, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/987,255

(22) Filed: Nov. 14, 2001

(65) Prior Publication Data

US 2002/0107320 A1 Aug. 8, 2002

(30) Foreign Application Priority Data

Dec. 5, 2000 (JP) ........................ 2000-370588
Sep. 13, 2001 (JP) ........................ 2001-278064

(51) Int. Cl.$^7$ ................................. C08J 3/16
(52) U.S. Cl. ............... 524/546; 524/546; 524/545; 524/543; 524/544; 526/247; 428/402
(58) Field of Search .................. 524/545, 543, 524/544, 546; 428/402; 526/247

(56) References Cited

U.S. PATENT DOCUMENTS

| 3,682,859 | A |   | 8/1972 | Taylor et al. .......... 260/41 AG |
| 4,143,110 | A | * | 3/1979 | Morozumi et al. ......... 264/117 |
| 4,370,436 | A | * | 1/1983 | Nakamura et al. .......... 264/117 |
| 5,189,143 | A | * | 2/1993 | Honda et al. ............... 528/498 |
| 5,216,068 | A | * | 6/1993 | Zipplies ..................... 523/335 |
| 5,709,944 | A | * | 1/1998 | Kokumai et al. ........... 428/402 |
| 6,037,402 | A | * | 3/2000 | Asano et al. ............... 524/543 |

FOREIGN PATENT DOCUMENTS

| JP | 8-30135 | 4/1989 |
| JP | 1-103642 | 4/1989 |
| JP | 9-169880 | 6/1997 |

* cited by examiner

*Primary Examiner*—David W. Wu
*Assistant Examiner*—Henry Hu
(74) *Attorney, Agent, or Firm*—Oblon, Spivak, McClelland, Maier & Neustadt, P.C.

(57) ABSTRACT

A polytetrafluoroethylene agglomerated product obtained from a polytetrafluoroethylene powder and a coke powder, wherein the polytetrafluoroethylene powder contains at least 8.3 mass % of a polytetrafluoroethylene fine powder having a particle diameter of from 0.1 to 9.5 $\mu$m, and the mass ratio of the polytetrafluoroethylene powder/the coke powder is 95-60/5-40.

15 Claims, No Drawings

POLYTETRAFLUOROETHYLENE AGGLOMERATED PRODUCT AND ITS MOLDED PRODUCT

The present invention relates to a tetrafluoroethylene agglomerated product which is useful as a molding material for e.g. sliding members.

Polytetrafluoroethylene (hereinafter referred to as PTFE) produced by suspension polymerization is used for molding by compression molding or ram extrusion molding. By suspension polymerization, PTFE particles having an average particle diameter of from 2 to 5 mm are usually obtained, and such particles are pulverized and used for various applications in the form of a PTFE powder having an average particle diameter of from 25 to 65 $\mu$m. Particularly, a PTFE agglomerated product obtained by uniformly mixing a PTFE powder having an average particle diameter of from 25 to 65 $\mu$m with various fillers to obtain a composition, followed by agglomeration, is used as a powder for molding.

A molded product obtained by molding such a PTFE agglomerated product has physical properties such as abrasion resistance and hardness improved over a molded product of PTFE containing no filler, and is widely used as various sliding members for sealing. However, in a case of producing a thin molded product or a very small molded product, such a PTFE agglomerated product has had no adequate property such as powder flow properties required for automated filling into a mold for molding.

JP-A-7-11088 discloses a PTFE agglomerated product obtained from a PTFE powder having an average particle diameter of at most 20 $\mu$m and a filler. It is disclosed that a PTFE agglomerated product obtained by using a glass fiber powder, a graphite powder, a bronze powder, a carbon fiber powder, etc., as a filler, has an excellent powder flow properties and a high bulk density and is useful for automation of the molding process by a mold or for improvement of the productivity. However, with respect to use of a coke powder as a filler, there is no disclosure.

Recently, a sliding member such as a so-called non-cut seal ring to be fit on a slide shaft while elongating the seal ring by means of a jig, is used in various apparatus. Accordingly, a sliding member having high elongation, which is useful for application to such a seal ring, is required, and the demand for a PTFE molded product having high elongation is increasing. Particularly, a sliding member having a high hardness excellent in abrasion resistance in addition to the high elongation is required for a seal ring on a sliding surface of an apparatus made of a material of high hardness such as iron or stainless steel.

JP-B-8-30135 discloses a composition comprising a graphite powder and a PTFE powder. A molded product obtained by molding this composition has high elongation, but the hardness is low. Further, such a composition is inadequate in the powder flow properties at the time of molding. Further, with respect to a PTFE agglomerated product, there is no disclosure.

JP-A-11-21407 discloses a composition comprising PTFE and a carbon filler having a specific surface area of at most 3 m$^2$/g. A molded product obtained by molding such a composition has high elongation, but such a composition is inadequate in the powder flow properties. Further, with respect to a PTFE agglomerated product, there is no disclosure.

It is an object of the present invention to provide a PTFE agglomerated product having excellent powder flow properties and a high bulk density, and a molded product having high elongation and high hardness, obtained by molding such a PTFE agglomerated product.

The present invention provides a polytetrafluoroethylene agglomerated product obtained from a polytetrafluoroethylene powder and a coke powder, wherein the polytetrafluoroethylene powder contains at least 8.3 mass % of a polytetrafluoroethylene fine powder having a particle diameter of from 0.1 to 9.5 $\mu$m, and the mass ratio of the polytetrafluoroethylene powder/the coke powder is 95-60/5-40.

Further, the present invention provides a molded product obtained by molding such a PTFE agglomerated product.

Now, the present invention will be described in detail with reference to the preferred embodiments.

The PTFE powder in the present invention contains at least 8.3 mass % of a PTFE fine powder having a particle diameter of from 0.1 to 9.5 $\mu$m (hereinafter referred to simply as the PTFE fine powder). If the content of the PTFE fine powder (hereinafter referred to as the PTFE fine powder content) in the PTFE powder is less than 8.3 mass %, the agglomerative tendency at the time of the production of the agglomerated product tends to be low, the powder flow properties of the PTFE agglomerated product thereby obtained, tends to be poor, and the elongation of the molded product tends to be low. The PTFE fine powder content in the PTFE powder is preferably at least 10 mass %, more preferably at least 12 mass %.

Further, the smaller the particle diameter of the PTFE fine powder, the better the agglomerative tendency. However, if the particle diameter is too small, production of such a PTFE fine powder tends to be difficult. On the other hand, with a PTFE fine powder having a particle diameter exceeding 9.5 $\mu$m, the effect for improvement of the agglomerative tendency is not large enough. If PTFE particles having too large article diameters are contained in the PTFE powder, the agglomerative tendency tends to be low, the powder flow properties of the agglomerated product tends to be low, and a molded product having a high elongation tends to be hardly obtainable. The maximum particle diameter of the PTFE powder is preferably at most 750 $\mu$m, more preferably at most 600 $\mu$m, most preferably at most 450 $\mu$m.

As a method for producing the PTFE powder in the present invention, it is preferred to pulverize PTFE particles having an average particle diameter of from 2 to 5 mm obtained by suspension polymerization. Particularly, a PTFE powder having an average particle diameter of at most 20 $\mu$m is preferred. For example, a PTFE powder having an average particle diameter of 20 $\mu$m obtained by pulverization contains 15 mass % of a PTFE fine powder.

Further, as a method for producing the PTFE powder in the present invention, it is also preferred to mix the PTFE powder having an average particle diameter of at most 20 $\mu$m, obtained by the pulverization, with a PTFE powder having an average particle diameter of from 25 to 65 $\mu$m, which is readily available. For example, when a PTFE powder having an average particle diameter of 5.7 $\mu$m and having a PTFE fine powder content of 90 mass % and a PTFE powder having an average particle diameter of 35.1 $\mu$m and having a PTFE fine powder content of 8 mass % are mixed by means of a Henschel mixer in a mass ratio of 20/80, a PTFE powder having an average particle diameter of 32.9 $\mu$m and having a PTFE fine powder content of 11.7 mass %, can be obtained.

As PTFE, a homopolymer of tetrafluoroethylene (hereinafter referred to as TFE) is employed, but PTFE containing polymerized units based on a comonomer copolymerizable with TFE in a proportion of at most 0.5 mol %, which will not impart melt flow properties, may also be employed.

Specific examples of such a comonomer may be fluoroolefins other than TFE, such as hexafluoropropylene, chlorotrifluoroethylene and trifluoroethylene, fluorovinyl ethers such as a perfluoro(alkyl vinyl ether), a perfluoro (alkoxy alkyl vinyl ether) and a (perfluoroalkyl) methyl trifluorovinyl ether, and olefins such as a (perfluoroalkyl) ethylene, ethylene and propylene. Particularly preferred are hexafluoropropylene, perfluoro(n-propyl vinyl ether) and (perfluoro-n-butyl)ethylene.

In the present invention, the average particle diameter of the coke powder is preferably from 1 to 50 μm. If the average particle diameter of the coke powder is too small, elongation of the PTFE molded product will be low, and if it is too large, the abrasion resistance of the PTFE molded product will be low. More preferably, the average particle diameter of the coke powder is from 10 to 35 μm.

In the present invention, the mass ratio of the PTFE powder/the coke powder is 95-60/5-40. If the PTFE powder is too much, the hardness of the molded product will be inadequate, and if it is too small, the tensile strength and elongation of the molded product tends to be low. The mass ratio of the PTFE powder/the coke powder is preferably 90-65/10-35. Especially, in order to obtain a molded product having a high hardness, the mass ratio of the PTFE powder/the coke powder is more preferably 85-65/15-35.

As a method for producing the PTFE agglomerated product of the present invention, it is possible to employ a dry method wherein no water is used, or a wet method wherein water is used. In the dry method, it is preferred that the PTFE powder and the coke powder, as the starting materials, are mixed by e.g. a Henschel mixer, and then, an organic solvent is added thereto as a binder, followed by agglomeration by a agglomeration machine of tumbling type, agitation type or fluidized bed type. In the wet method, it is preferred that using an organic medium insoluble in water as a binder, a mixture of the PTFE powder and the coke powder as the starting materials, is stirred in water for agglomeration.

In the present invention, the functional mechanism of the PTFE powder and the coke powder is not necessarily clearly understood, but is considered to be as follows. By the use of the PTFE powder having a high PTFE fine powder content, the adhesive forces among the PTFE powder and between the PTFE powder and the coke powder are increased, and the agglomerative tendency is thereby improved, whereby a PTFE agglomerated product which is dense and has a high bulk density and which is excellent in the powder flow properties, can be obtained. Further, it is considered that by the combination of the coke powder to such a PTFE powder, a PTFE molded product having high elongation and high hardness, can be obtained.

As the method for molding the PTFE agglomerated product of the present invention, a compression molding method or a ram extrusion molding method may, for example, be employed. In the compression molding method, the following molding conditions are preferred. Molding pressure at the time of preforming: 44 to 118 MPa; molding speed: 100 mm/min until 1/2 of the stroke length is reached, and 20 mm/min after 1/2 of the stroke length is reached, until the maximum pressure; holding time at the maximum pressure: 2 minutes per kg of the powder; the maximum sintering temperature at the time of sintering: 360 to 380° C.; holding time at the maximum temperature: time X calculated by the following formula; temperature raising and cooling rate: 50 to 70° C./hr.

$$X=2+(\text{wall thickness (unit: cm) of the molded product})\times(1\text{ hr}/1\text{ cm of wall thickness})$$

As applications of the molded products of the present invention, sliding members such as piston rings or shock absorbers, and sealing members such as gaskets or backup rings, may, for example, be mentioned.

Now, the present invention will be described in further detail with reference to Examples (Examples 1 to 4, 9 and 10) and Comparative Examples (Examples 5 to 8 and 11). However, it should be understood that the present invention is by no means restricted to such specific Examples. The properties of the PTFE powder and the PTFE agglomerated product were measured by the following methods.

Particle Diameters (unit: μm) of the PTFE Powder and the Coke Powder

Measured by laser diffraction type particle diameter distribution measuring apparatus SALD-3000, manufactured by Shimadzu Corporation. From the obtained particle diameter distribution of the PTFE powder, the PTFE fine powder content and the average particle diameter of the PTFE powder were calculated by integral calculus.

Average Particle Diameter (unit: μm) of the PTFE Agglomerated Product

Sequentially from the top, standard sieves of 10, 20, 35, 40 and 60 mesh, were put together, and the PTFE agglomerated product was placed on the 10 mesh sieve, followed by shaking, whereupon the mass of the PTFE agglomerated product remaining on each sieve, was obtained. Based on this mass, the 50% particle diameter was obtained by a logarithmic probability paper and was taken as the average particle diameter of the PTFE agglomerated product.

Bulk Density (Unit: g/l) of the PTFE Agglomerated Product

Measured in accordance with JIS K6891. Into a stainless steel weighing bottle having an internal volume of 100 ml, a sample of the PTFE agglomerated product was dropped from a funnel set above, and the sample bulging from the weighing bottle was scraped off with a flat plate, whereupon the weight of the sample remaining in the bottle was measured, and a value obtained by dividing the measured weight by the internal volume of the weighing bottle, was taken as the bulk density.

Powder Flow Properties (Unit: mm) of the PTFE Agglomerated Product 100 g of a sample of the PTFE agglomerated product was put into a container having a hopper shape, and the bottom of the container was opened at a constant rate, whereby the distance of the opening (the slit) when about 50 g of the sample was dropped, was taken as the powder flow properties. The smaller the numerical value, the better the powder flow properties.

Tensile Strength (Unit: MPa) and Elongation (Unit: %)

Measured in accordance with JIS K6891. A test sample was prepared as follows. The PTFE agglomerated product was preformed under a pressure of 58.9 MPa and baked at 370° C. for 4 hours, followed by cooling at a temperature lowering rate of 70° C./hr to obtain a sheet having a thickness of 2 mm, from which a test sample was punched out by a dumbbell No. 3 die. However, in Example 6, instead of the PTFE agglomerated product, a test sample obtained by molding a PTFE composition, was used.

Hardness (Unit: Durometer D)

Measured in accordance with JIS K7215.

EXAMPLES 1 to 5

PTFE powders as identified in Table 1 (FLUON G190 series, manufactured by ASAHI GLASS FLUOROPOLYMERS CO., LTD.) were used. When PTFE powders were used as mixed, a Henschel mixer was used. For example, in Example 3, FLUON G190-5 and FLUON G190-35 were mixed in a mass ratio of 50/50 by a Henschel mixer at a peripheral speed of stirring vanes of 40 m/sec for a stirring time of 90 seconds, to obtain a PTFE powder. The obtained PTFE powder contained 24.1 mass % of a PTFE fine powder and had an average particle diameter of 25.5 μm. Also in Example 4, a PTFE powder obtained by preliminary mixing in the same manner as in Example 3, was used. The PTFE fine powder contents in the obtained PTFE powders were measured, and the results are shown in Table 2.

TABLE 1

| Fluon No. | Average particle diameter (μm) | PTFE fine powder content (mass %) | Maximum particle size (μm) |
|---|---|---|---|
| G190-5 | 5.7 | 90.0 | 25.6 |
| G190-10 | 11.9 | 32.4 | 69.0 |
| G190-35 | 35.1 | 8.1 | 336.4 |
| G163-35 | 40.0 | 5.2 | 442.0 |

To 800 g of the PTFE powder, 200 g of a coke powder having an average particle diameter of 30 μm (KC-200, manufactured by Fuji Kokuen K. K.) was added, followed by mixing by a Henschel mixer at a peripheral velocity of stirring vanes of 40 m/sec for a stirring time of 90 seconds, to obtain a PTFE composition. The obtained PTFE composition was agglomerated by using petroleum naphtha as a binder, and the particle diameter was adjusted by a pan pelletizer, followed by drying to obtain a PTFE agglomerated product. In Table 2, the mixing mass ratio of the PTFE powder and the coke powder as the starting materials, the average particle diameter, bulk density and powder flow properties of the obtained PTFE agglomerated product, and the tensile strength, elongation and hardness of the molded product obtained by molding the PTFE agglomerated product, are shown.

EXAMPLE 6

The starting materials as identified in Table 2 were mixed by a Henschel mixer at a peripheral speed of stirring vanes of 40 m/sec for a stirring time of 90 seconds to obtain a PTFE composition. The bulk density and powder flow properties of the obtained PTFE composition were measured in the same manner as the PTFE agglomerate product. Further, the properties of a molded product of the PTFE composition obtained by molding in the same manner as the PTFE agglomerated product, were measured in the same manner as in Examples 1 to 5, and the results are shown in Table 2.

EXAMPLES 7 and 8

A PTFE agglomerated product and a molded product were obtained in the same manner as in Examples 1 to 4 except that 200 g of a graphite powder having an average particle diameter of 30 μm (KS-75, manufactured by Fuji Kokuen K. K.) was used instead of the coke powder. The properties of the PTFE agglomerated product and the properties of the molded product were measured in the same manner as in Examples 1 to 4, and the results are shown in Table 2.

TABLE 2

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Starting material composition | PTFE powder | G190-5 | 80 | — | 40 | 20 | — | — | 80 | — |
| | | G190-10 | — | 80 | — | — | — | — | — | — |
| | | G190-35 | — | — | 40 | 60 | 80 | 80 | — | 80 |
| | | G163-35 | — | — | — | — | — | — | — | — |
| | Coke powder | | 20 | 20 | 20 | 20 | 20 | 20 | — | — |
| | Graphite powder | | — | — | — | — | — | — | 20 | 20 |
| PTFE fine powder content | | | 90.0 | 32.4 | 24.1 | 11.7 | 8.1 | 8.1 | 90.0 | 8.1 |
| Properties of the composition | Bulk density | | — | — | — | — | — | 516 | — | — |
| | Powder flow properties | | — | — | — | — | — | 35 | — | — |
| Properties of the agglomerated product | Average particle diameter | | 570 | 520 | 845 | 490 | 475 | — | 460 | 465 |
| | Bulk density | | 768 | 765 | 761 | 710 | 755 | — | 722 | 692 |
| | Powder flow properties | | 10 | 12 | 14 | 18 | 15 | — | 12 | 15 |
| Properties of the molded product | Tensile strength | | 16.3 | 16.0 | 15.1 | 18.6 | 14.4 | 21.3 | 13.9 | 11.9 |
| | Elongation | | 325 | 275 | 255 | 324 | 205 | 333 | 288 | 127 |
| | Hardness | | 63 | 63 | 63 | 66 | 63 | — | 59 | 59 |

EXAMPLES 9 to 11

With the starting material composition as identified in Table 3, a PTFE agglomerated product was obtained in the same manner as in Examples 1 to 5. The average particle diameter, bulk density and powder flow properties of the obtained PTFE agglomerated product, and the tensile strength, elongation and hardness of a molded product obtained by molding the PTFE agglomerated product, are shown in Table 3.

TABLE 3

| | | | Ex. 9 | Ex. 10 | Ex. 11 |
|---|---|---|---|---|---|
| Starting material composition | PTFE powder | G190-5 | 20 | 35 | — |
| | | G190-10 | — | — | — |
| | | G190-35 | — | — | — |
| | | G163-35 | 50 | 35 | 70 |
| | Coke powder | | 30 | 30 | 30 |

TABLE 3-continued

|  |  | Ex. 9 | Ex. 10 | Ex. 11 |
|---|---|---|---|---|
| Properties of the composition | Graphite powder | — | — | — |
|  | PTFE fine powder content | 8.4 | 22.0 | 5.2 |
|  | Bulk density | — | — | — |
|  | Powder flow properties | — | — | — |
| Properties of the agglomerated product | Average particle diameter | 490 | 450 | 510 |
|  | Bulk density | 686 | 680 | 620 |
|  | Powder flow properties | 11 | 25 | 32 |
| Properties of the molded product | Tensile strength | 14.7 | 16.9 | 14.8 |
|  | Elongation | 62 | 68 | 45 |
|  | Hardness | 70 | 72 | 70 |

The PTFE agglomerated product of the present invention has a high bulk density and is excellent in the powder flow properties, and thus, it is useful for e.g. automation of the molding process by a mold or improvement of the productivity. Further, the molded product obtained from the PTFE agglomerated product of the present invention has high elongation and high hardness, and thus, it is useful as a sliding member such as a sealing ring to be stretched and mounted on a sliding surface having high hardness.

The entire disclosures of Japanese Patent Application No. 2000-370588 filed on Dec. 5, 2000 and Japanese Patent Application No. 2001-278064 filed on Sep. 13, 2001 including specifications, claims and summaries are incorporated herein by reference in their entireties.

What is claimed is:

1. A polytetrafluoroethylene agglomerated product obtained from a polytetrafluoroethylene powder and a coke powder, wherein the polytetrafluoroethylene powder contains at least 8.3 mass % of a polytetrafluoroethylene fine powder having a particle diameter of from 0.1 to 9.5 $\mu$m, and the mass ratio of the polytetrafluoroethylene powder/the coke powder is 95-60/5-40.

2. The polytetrafluoroethylene agglomerated product according to claim 1, wherein said polytetrafluoroethylene is a homopolymer of tetrafluoroethylene.

3. The polytetrafluoroethylene agglomerated product according to claim 1, wherein said polytetrafluoroethylene is a copolymer of tetrafluoroethylene and at most 0.5 mol % of a fluoroolefin comonomer.

4. The polytetrafluoroethylene agglomerated product according to claim 3, wherein said fluoroolefin is hexafluoropropylene.

5. The polytetrafluoroethylene agglomerated product according to claim 1, wherein said polytetrafluoroethylene is a copolymer of tetrafluoroethylene and at most 0.5 mol % of a fluorovinyl ether comonomer.

6. The polytetrafluoroethylene agglomerated product according to claim 5, wherein said fluoroolefin is selected from the group consisting of a perfluoro(alkyl vinyl ether), a (perfluoroalkyl)methyl trifluorovinyl ether, and a (perfluoroalkyl)methyl trifluorovinyl ether.

7. The polytetrafluoroethylene agglomerated product according to claim 5, wherein said fluoroolefin is perfluoro (n-propyl vinyl ether).

8. The polytetrafluoroethylene agglomerated product according to claim 1, wherein the polytetrafluoroethylene powder contains at least 10 mass % of the polytetrafluoroethylene fine powder.

9. The polytetrafluoroethylene agglomerated product according to claim 1, wherein the polytetrafluoroethylene powder contains at least 12 mass % of the polytetrafluoroethylene fine powder.

10. The polytetrafluoroethylene agglomerated product according to claim 1, wherein the maximum particle diameter of the polytetrafluoroethylene powder is at most 450 $\mu$m.

11. The polytetrafluoroethylene agglomerated product according to claim 1, wherein the average particle diameter of the coke powder is from 1 to 50 $\mu$m.

12. The polytetrafluoroethylene agglomerated product according to claim 1, wherein the average particle diameter of the coke powder is from 10 to 35 $\mu$m.

13. The polytetrafluoroethylene agglomerated product according to claim 1, wherein the mass ratio of the polytetrafluoroethylene powder/the coke powder is 90-65/10-35.

14. A molded product obtained by molding the agglomerated product as defined in claim 1.

15. A molded product obtained by molding the agglomerated product as defined in claim 1 by compression molding or ram extrusion molding.

* * * * *